(12) United States Patent
Okabe et al.

(10) Patent No.: US 10,038,202 B2
(45) Date of Patent: Jul. 31, 2018

(54) FUEL CELL SEPARATOR, FUEL CELL, AND FUEL CELL BATTERY

(71) Applicant: TOYOTA JIDOSHA KABUSHIKI KAISHA, Toyota-shi, Aichi-ken (JP)

(72) Inventors: Hiroki Okabe, Okazaki (JP); Norishige Konno, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 331 days.

(21) Appl. No.: 14/918,871

(22) Filed: Oct. 21, 2015

(65) Prior Publication Data

US 2016/0133950 A1    May 12, 2016

(30) Foreign Application Priority Data

Nov. 6, 2014  (JP) .................. 2014-226016

(51) Int. Cl.
| | | |
|---|---|---|
| *H01M 2/38* | (2006.01) | |
| *H01M 8/0247* | (2016.01) | |
| *H01M 8/0267* | (2016.01) | |
| *H01M 8/1018* | (2016.01) | |

(52) U.S. Cl.
CPC ....... *H01M 8/0247* (2013.01); *H01M 8/0267* (2013.01); *H01M 2008/1095* (2013.01)

(58) Field of Classification Search
CPC ............ H01M 8/0247; H01M 8/0267; H01M 8/0202; H01M 2008/1095
See application file for complete search history.

(56) References Cited

FOREIGN PATENT DOCUMENTS

| JP | 2006-32008 | * | 2/2006 | ............. H01M 8/02 |
|---|---|---|---|---|
| JP | 2006-032008 A | | 2/2006 | |
| JP | 2011-014376 A | | 1/2011 | |
| JP | 2012-018883 | | 1/2012 | |
| JP | 2013-118125 A | | 6/2013 | |
| JP | 2014-165071 A | | 9/2014 | |

* cited by examiner

*Primary Examiner* — Raymond Alejandro
(74) *Attorney, Agent, or Firm* — Finnegan, Henderson, Farabow, Garrett & Dunner, LLP

(57) ABSTRACT

A fuel cell separator 10 includes a power generation section 10B provided in a central region on a surface of the separator formed into a plate, a plurality of manifolds 11A, 11B, 12A, and 12B provided in a region closer to the outer periphery than the power generation section 10B, and a reinforcing portion 14A provided so as to extend from a manifold beam portion 15 formed between the plurality of manifolds 11A, 11B, 12A, and 12B to a gap region 13 formed between the power generation section 10B and the manifolds 11A, 11B, 12A, and 12B.

6 Claims, 6 Drawing Sheets

FUEL CELL SEPARATOR, FUEL CELL, AND FUEL CELL BATTERY

BACKGROUND OF THE INVENTION

Field of the Invention

The present invention relates to a fuel cell separator, a fuel cell, and a fuel cell battery.

Background Art

Conventionally, there has been suggested and in practical use a fuel cell battery having a membrane-electrode assembly (MEA) formed by providing catalyst layers for electrodes on both sides of an electrolyte membrane and a separator for pinching the MEA. In the fuel cell battery system including the fuel cell battery, fuel gas is supplied to one (anode electrode) of the electrodes constituting the MEA of the fuel cell battery and oxidation gas is supplied to the other electrode (cathode electrode) to cause an electrochemical reaction, thereby generating electricity. Nowadays, there is employed a technique of generating large electric power by providing a stack formed by stacking a plurality of fuel cells each having a single MEA.

The separator constituting the fuel cell battery is a plate-like member including a gas flow path provided on a surface opposed to the MEA and a manifold for use in circulating reaction gas (fuel gas or oxidation gas) from the outside to the gas flow path. The separator has a function of preventing a short circuit caused by contact between the anode electrode and the cathode electrode of adjacent fuel cells in a state where the stacked fuel cells are separated from each other and a function of allowing the adjacent cells to have electrical continuity to each other. At present, there is suggested a technique of providing a plurality of projecting portions in a region between a power generation section provided in the central region of the separator and manifolds provided in a region close to the outer periphery of the separator (for example, refer to Patent Document 1).

CITATION LIST

Patent Document

[Patent Document 1] JP2012-018883 A

SUMMARY OF THE INVENTION

In the separator, the strength of manifold portions (particularly, manifold beam portions which form manifolds) is low in comparison with the strength of the power generation section. Therefore, the manifold portions of the separator deform in a stacking direction at the time of stacking cells, thereby causing deterioration in sealing performance problematically. In this respect, the use of the technique as described in Patent Document 1 is likely to reinforce the region between the power generation section and the manifolds. The technique, however, is not able to suppress the deformation of the manifold beam portions, and thus the problem of the deterioration in sealing performance still exists.

The present invention has been provided in view of the above problem. Therefore, it is an object of the present invention to prevent deterioration in sealing performance by suppressing the deformation of manifold portions of a fuel cell separator.

In order to achieve the above object, the present invention has been provided. According to an aspect of the present invention, there is provided a fuel cell separator including: a power generation section provided in a central region on a surface of the separator formed into a plate; a plurality of manifolds provided in a region closer to the outer periphery than the power generation section; and a reinforcing portion provided so as to extend from a manifold beam portion formed between the plurality of manifolds to a gap region formed between the power generation section and the manifolds.

In the above configuration, the reinforcing portion is provided so as to extend from the manifold beam portion formed between the plurality of manifolds to the gap region formed between the power generation section and the manifolds, thereby enabling the suppression of deformation of the manifold portion in the stacking direction and thus preventing deterioration in sealing performance.

In the fuel cell separator according to the present invention, it is possible to adopt a protrusion formed so as to protrude into a surface where a cooling water flow path is formed as the reinforcing portion. In this case, the adopted protrusion may have a planar shape so as to guide cooling water, from a cooling water inlet-side manifold to the cooling water flow path, and/or, from the cooling water flow path to the cooling water outlet-side manifold.

In the above configuration, it is also possible to cause the reinforcing portion (the protrusion formed so as to protrude into the surface where the cooling water flow path is formed) to function as a cooling water guiding unit for guiding the cooling water, from the cooling water inlet-side manifold to the cooling water flow path, and/or, from the cooling water flow path to the cooling water outlet-side manifold.

The fuel cell separator according to the present invention may be a press type separator disposed so as to be opposed to the anode side of a membrane-electrode assembly without provision of a recess portion in a region in contact with the membrane-electrode assembly.

The above configuration enables the suppression of deformation in the stacking direction of the manifold beam portion of the press type separator disposed on the anode side. Moreover, in the press type separator, no recess portion is provided in the region in contact with the membrane-electrode assembly, thereby enabling the prevention of an occurrence of a damage caused by the membrane-electrode assembly, which is in contact with the separator, eating into a recess portion.

The fuel cell separator according to the present invention may be a flat type separator disposed so as to be opposed to the cathode side of the membrane-electrode assembly.

The above configuration enables the suppression of deformation in the stacking direction of the manifold beam portion of the flat type separator disposed on the cathode side.

Furthermore, a fuel cell according to the present invention includes the foregoing fuel cell separator.

Still further, a fuel cell battery according to the present invention includes a plurality of the foregoing fuel cells being stacked.

According to the present invention, the deformation of the manifold portions of the fuel cell separator is able to be suppressed, thereby preventing deterioration in sealing performance.

DESCRIPTION OF THE PREFERRED EMBODIMENTS

Figure 1:
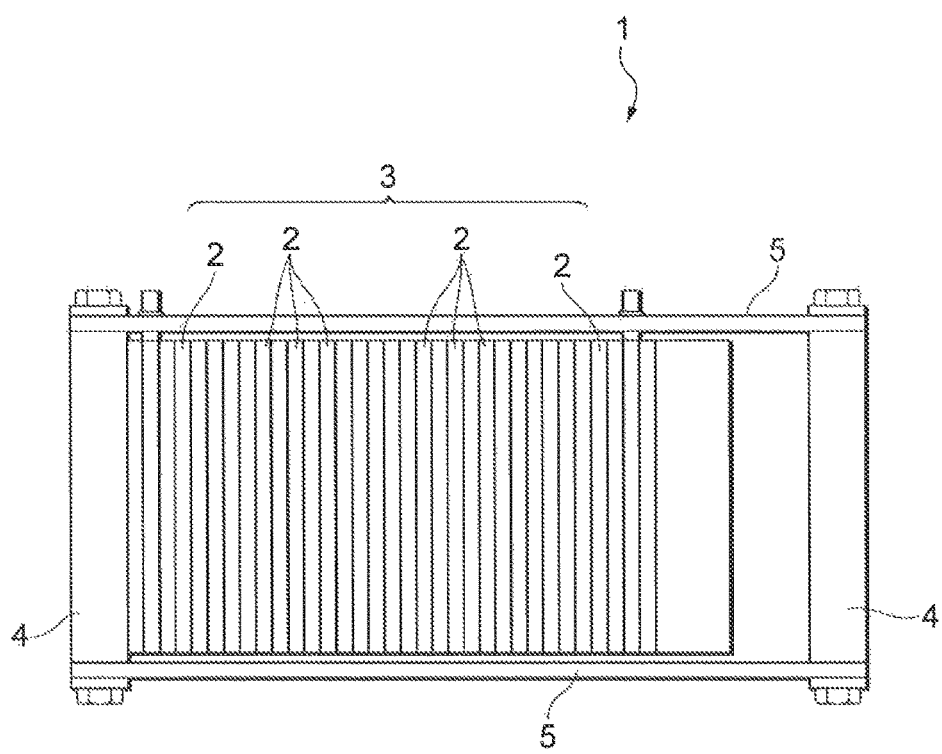
FIG. 1 is a side view illustrating a schematic configuration of a fuel cell battery according to an embodiment of the present invention.

Hereinafter, the embodiments of the present invention will be described with reference to the accompanying drawings. The positional relationship such as up and down, right and left, or the like in the drawings is based on the positional relationship in the drawings, unless otherwise specified. Moreover, the dimension ratios in the drawings are not limited to the illustrated ratios. Moreover, the embodiments described below are illustrative for describing the present invention and not intended to limit the present invention only to the embodiments. Furthermore, the present invention can be varied in various ways without departing from the scope of the present invention.

First, the configuration of a fuel cell battery 1 according to an embodiment of the present invention will be described with reference to FIG. 1.

The fuel cell battery 1 according to this embodiment includes a cell stack 3 formed by sequentially stacking a plurality of fuel cells 2. The cell stack 3 is sandwiched between a pair of end plates 4 at both ends and is fastened with load applied in the stacking direction in a state where a restraint member composed of tension plates 5 is disposed so as to connect the end plates 4 to each other.

Although the fuel cell battery 1 composed of the fuel cells 2 and the like can be used as an in-vehicle power generation system of, for example, a fuel cell hybrid vehicle (FCHV), the fuel cell battery 1 is not limited thereto and can also be used as a power generation system mounted on a body capable of self-travelling such as various mobile bodies (for example, a vessel, an aircraft, or the like) or on a robot or can be used as a stationary fuel cell battery.

The fuel cell 2 includes a membrane-electrode assembly (MEA), which is not illustrated, a pair of separators (an anode-side separator 10 and a cathode-side separator 20 described later in detail) for pinching the MEA, a seal member disposed between the pair of separators, and a gasket disposed between the fuel cells. Each of the MEA and the pair of separators is formed in a substantially rectangular plate. The MEA is formed in such a way that the outer shape thereof is smaller than the outer shape of the pair of separators.

The MEA includes a polyelectrolyte membrane (hereinafter, referred to as "electrolyte membrane" in some cases) formed of an ion exchange membrane of polymer material and a pair of electrodes (an anode-side diffusion electrode and a cathode-side diffusion electrode) sandwiching the electrolyte membrane from both sides. The electrolyte membrane is formed larger than each electrode. Each electrode is joined to the electrolyte membrane, for example, in a hot-press method. Each of the electrodes constituting the MEA is formed of, for example, porous carbon material (diffusion layer) carrying catalyst such as platinum deposited on the surface of the electrode. One electrode (anode) is supplied with fuel gas such as hydrogen gas, while the other electrode (cathode) is supplied with oxidation gas such as air. These two types of reaction gas cause an electrochemical reaction in the MEA to generate an electromotive force in the fuel cells 2.

The seal member is formed between the pair of separators and in the peripheral portion of the MEA. The MEA and the pair of separators or the like are bonded to each other through the seal member. The seal member may be, for example, adhesive or the like enabling bonding by chemical bonding with an adjacent member. The gasket suppresses the leakage of oxidation gas, hydrogen gas, or the like by sealing between the fuel cells 2. The material of the gasket may be an elastic body for sealing fluid by physical adhesion to an adjacent member, adhesive for bonding by chemical bonding with an adjacent member, or the like.

The following describes a pair of separators (an anode-side separator 10 and a cathode-side separator 20) constituting the fuel cell 2 according to the embodiment of the present invention with reference to FIGS. 2 to 5.

The anode-side separator 10 (FIGS. 2 to 4) and the cathode-side separator 20 (FIG. 5) are formed of gas-impermeable conductive material. As the conductive material, there may be used, for example, carbon, hard resin having electrical conductivity, and metal such as aluminum, stainless steel, or the like. The base material of the separators 10 and 20 in this embodiment is formed of plate-like metal. A membrane excellent in corrosion resistance (for example, a membrane formed by gold plating) is formed on the surface on each electrode side of the base material.

Figure 2:
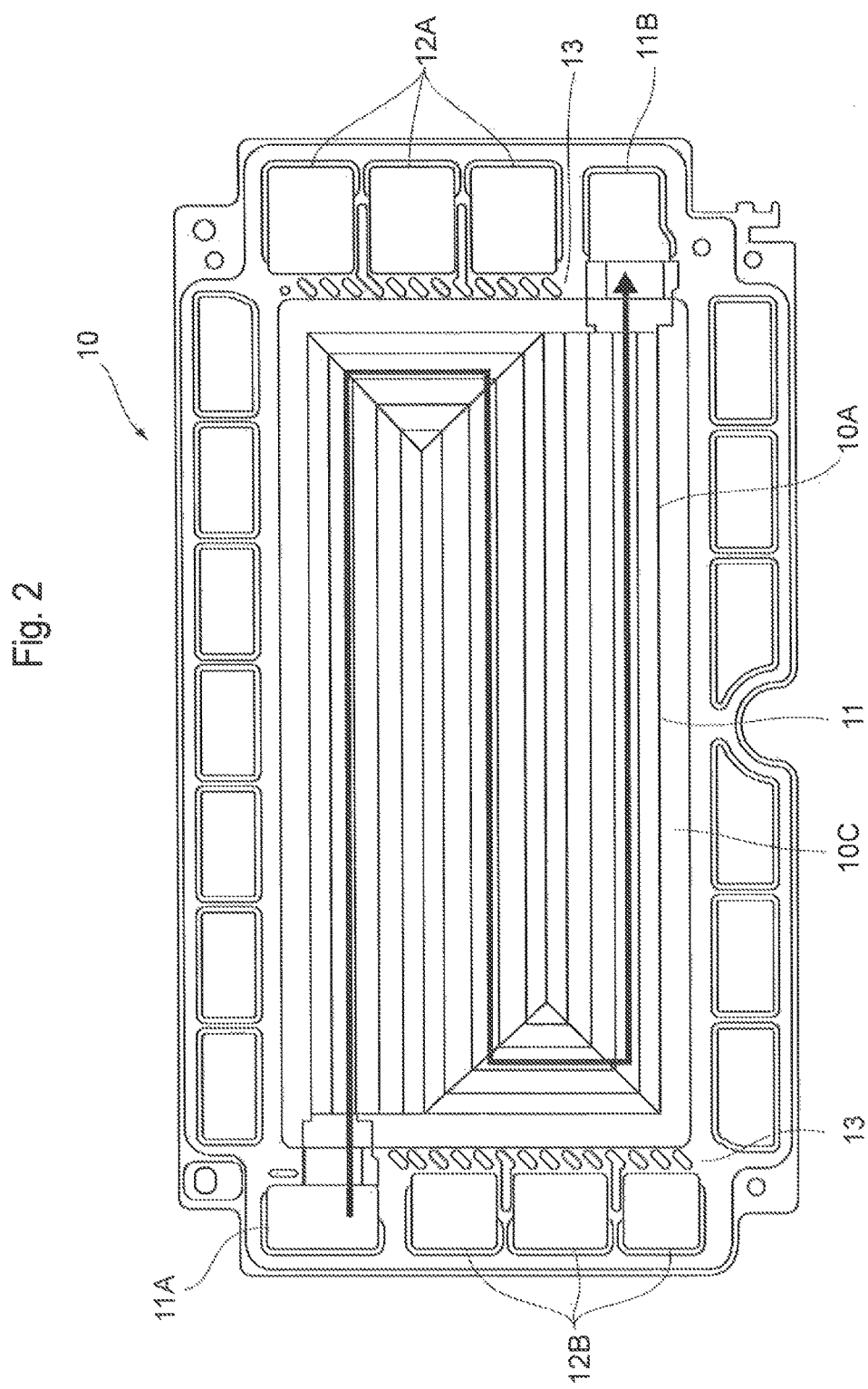
FIG. 2 is a diagram illustrating a surface on the fuel gas flow path side of an anode-side separator constituting a fuel cell according to the embodiment of the present invention.
Figure 3:
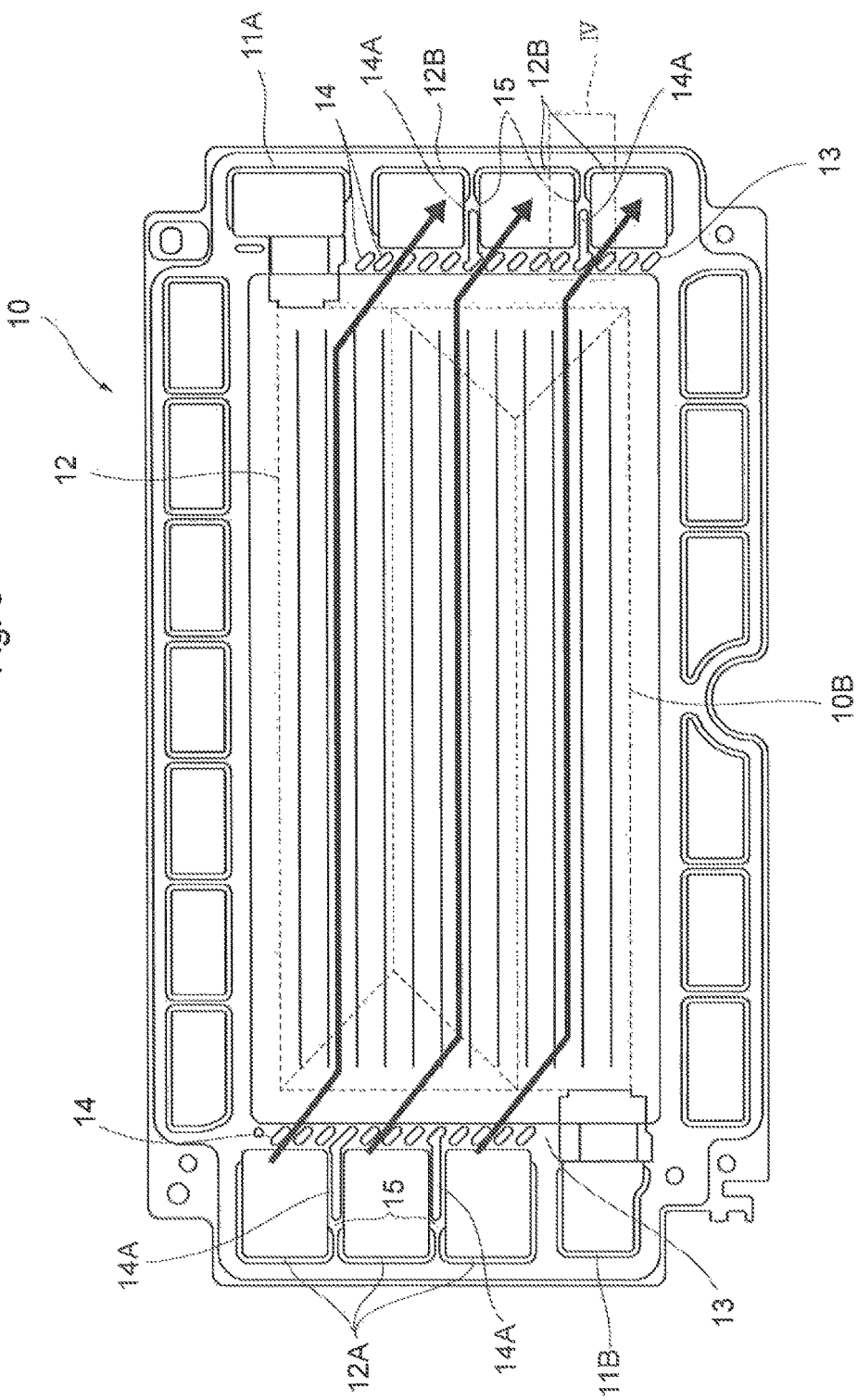
FIG. 3 is a diagram illustrating a surface on the cooling water flow path side of the anode-side separator constituting the fuel cell according to the embodiment of the present invention.

The anode-side separator 10 is disposed so as to be opposed to the anode side of the MEA. The anode-side separator 10 is a so-called press type separator in which a plurality of groove-shaped flow paths is formed by pressing on both sides of the anode-side separator 10. More specifically, a fuel gas flow path 11 as illustrated in FIG. 2 is formed in a central region 10A of the surface (inside surface) opposed to the MEA of the anode-side separator 10, while a cooling water flow path 12 as illustrated in FIG. 3 is formed in a central region 10B of the rear surface (outside surface) of the anode-side separator 10. The central regions 10A and 10B of the anode-side separator 10 function as power generation sections. The MEA has an area slightly larger than that of the central region 10A (power generation section) of the anode-side separator 10. In this embodiment, any recess portion is not provided in a region (a region slightly larger than the power generation section 10A) 10C in contact with the MEA of the anode-side separator 10, as illustrated in FIG. 2.

In the region closer to the outer periphery than the central regions 10A or 10B (power generation section) of the anode-side separator 10, there are provided a plurality of manifolds (a fuel gas inlet-side manifold 11A, a fuel gas outlet-side manifold 11B, a cooling water inlet-side manifold 12A, and a cooling water outlet-side manifold 12B), as illustrated in FIGS. 2 and 3. The manifolds 11A, 11B, 12A, and 12B in this embodiment are holes substantially rectangular in a plan view. Fuel gas supplied from the outside is introduced into the fuel gas flow path 11 (FIG. 2) through the fuel gas inlet-side manifold 11A and circulates in the fuel gas flow path 11. Thereafter, the fuel gas is discharged to the outside through the fuel gas outlet-side manifold 11B. On the other hand, the cooling water supplied from the outside is introduced into the cooling water flow path 12 (FIG. 3) through the cooling water inlet-side manifold 12A and circulates in the cooling water flow path 12. Thereafter, the cooling water is discharged to the outside through the cooling water outlet-side manifold 12B.

Figure 4:
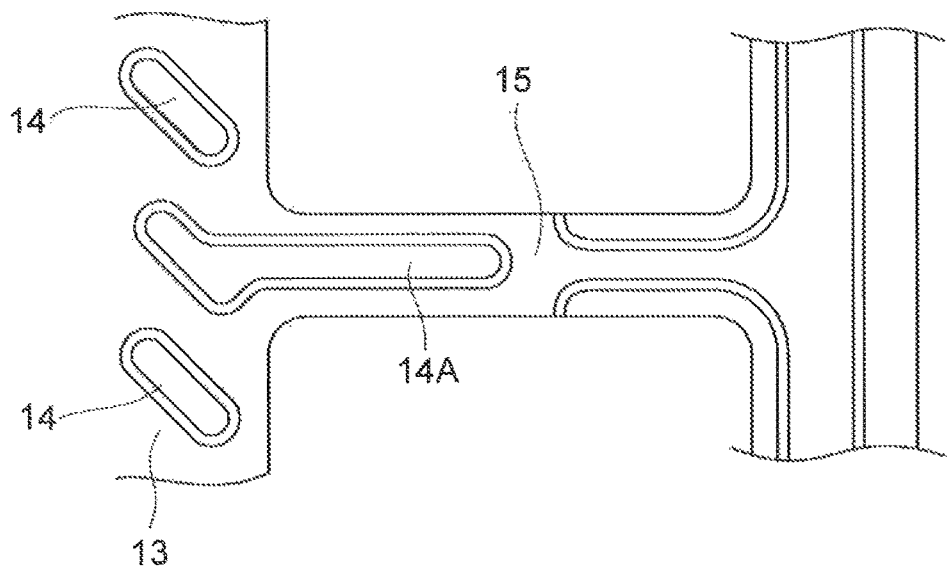
FIG. 4 is an enlarged view of an IV portion of FIG. 3.

A plurality of protrusions 14 is provided in a gap region 13 formed between the central region 10A or 10B (power generation section) of the anode-side separator 10 and the plurality of manifolds 11A, 11B, 12A, and 12B, where the protrusions 14 are formed so as to protrude to the surface (FIG. 3) where the cooling water flow path 12 is formed. As illustrated in FIG. 4, some (specific protrusions 14A) of the protrusions 14 are formed so as to extend from the gap region 13 to manifold beam portions 15 formed between the plurality of manifolds 11A, 11B, 12A, and 12B, thereby functioning as reinforcing portions for suppressing the deformation of the manifold portion.

Figure 6A:
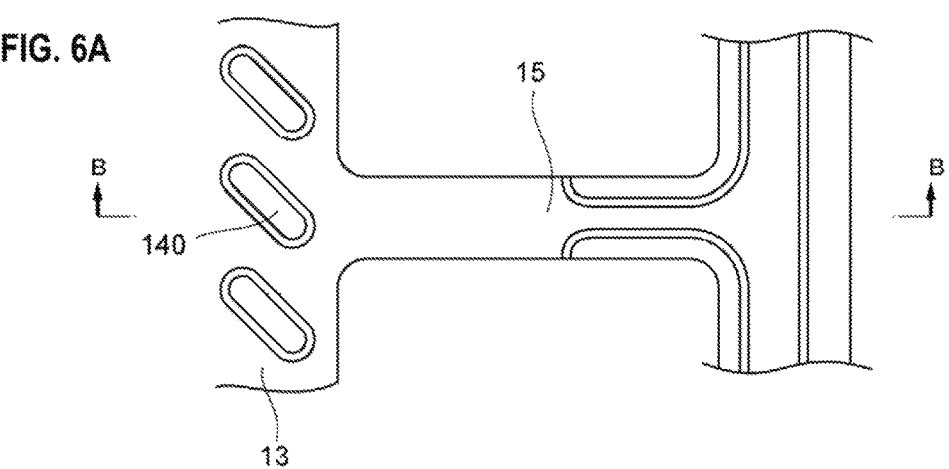
FIG. 6A is an enlarged plan view illustrating a region in the vicinity of a manifold beam portion of a conventional separator and FIG. 6B is a cross-sectional view taken along line B-B of FIG. 6A.
Figure 6B:
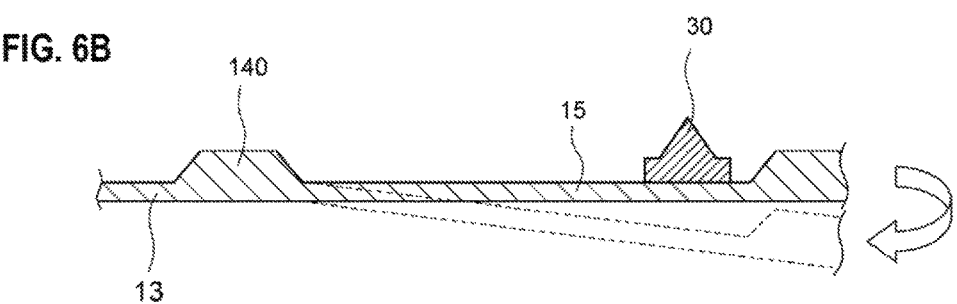

Conventionally, as illustrated in FIG. 6A, protrusions (reinforcing portions) 140 have been provided only in a gap region 13 formed between the power generation section of the anode-side separator 10 and manifolds. Therefore, the stacking of fuel cells 2 through a gasket 30 causes the deformation of each manifold beam portion 15 as indicated by dashed lines in FIG. 6B problematically. In contrast, in this embodiment, the specific protrusions 14A (reinforcing portions) are formed so as to extend from the gap region 13 to the central portions of the respective manifold beam portions 15 as illustrated in FIG. 4, thus enabling the suppression of the deformation of the manifold beam portions 15 during cell stacking.

Moreover, each protrusion 14 in this embodiment has a configuration of guiding cooling water as illustrated in FIGS. 3 and 4. Specifically, the protrusions 14 are disposed in an inclined state at a predetermined angle relative to the longitudinal direction of the anode-side separator 10 so as to guide the cooling water from the cooling water inlet-side manifolds 12A at the upper left of the paper surface in FIG. 3 to the cooling water flow path 12 at the slightly lower right of the paper surface than the cooling water inlet-side manifolds 12A and further to guide the cooling water from the cooling water flow path 12 to the cooling water outlet-side manifolds 12B at the slightly lower right of the paper surface than the cooling water flow path 12. The specific protrusion 14A has such a planar shape that the portion inclined at the above angle is coupled with the portion extending along the extension direction of the manifold beam portion 15, as illustrated in FIG. 4.

Figure 5:
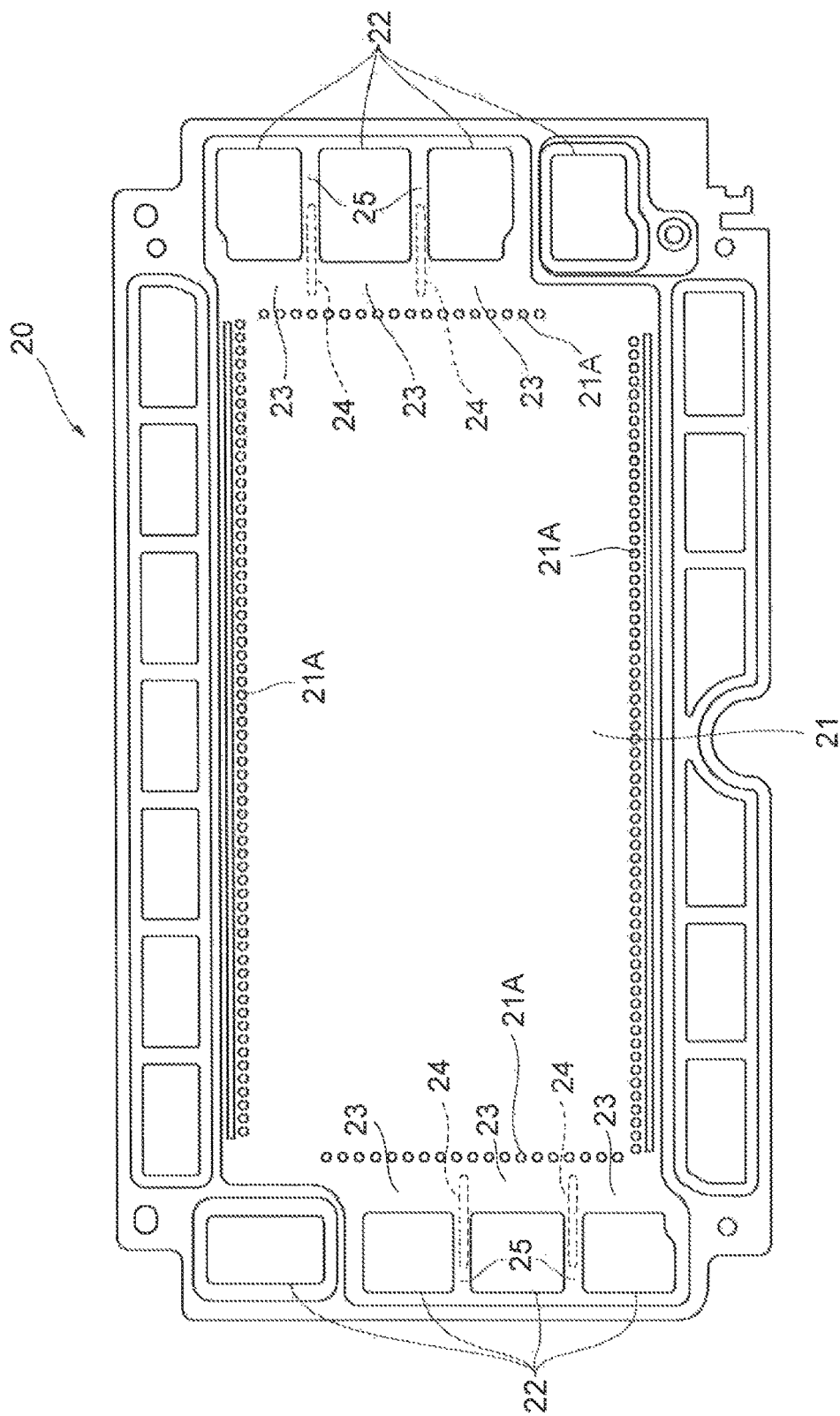
FIG. 5 is a plan view of a cathode-side separator constituting the fuel cell according to the embodiment of the present invention.

The cathode-side separator 20 illustrated in FIG. 5 is disposed so as to be opposed to the cathode side of the MEA. The cathode-side separator 20 is a so-called flat type separator which is formed of a substantially flat plate having no groove on its surface on the MEA side. In addition, the flat type separator is not only a separator with its surface not pressed, but also can be a separator with its surface pressed more slightly than a press type separator. Moreover, the term "being slightly pressed" means a state where a narrower region than in the press type separator is pressed, a region is pressed shallowly, only a few regions are pressed, or the like.

In the region closer to the outer periphery than the central region 21 (power generation section) of the cathode-side separator 20, a plurality of manifolds 22 is provided as illustrated in FIG. 5. Moreover, a plurality of projecting portions 21A, each circular in a plan view, is provided in the vicinity of an edge portion of the central region 21 (power generation section) of the cathode-side separator 20. The projecting portion 21A functions as a reinforcing portion which suppresses the deformation (deflection or waviness) of the cathode-side separator 20. The shape and size of the projecting portion 21A can be selected from various ones in view of the size of the cathode-side separator 20 or the flow distribution performance of gas.

In the anode-side separator 10 according to the embodiment described hereinabove, the specific protrusions 14A (reinforcing portions) are provided so as to extend from the manifold beam portions 15 formed between the plurality of manifolds to the gap region 13 formed between the power generation section and the manifolds, respectively. This enables the suppression of deformation of the manifold beam portions 15 in the stacking direction, thereby preventing deterioration in sealing performance.

Moreover, in the anode-side separator 10 according to the embodiment described hereinabove, it is also possible to cause the specific protrusions 14A (reinforcing portions) and other protrusions 14 to function as a cooling water guiding unit which guides the cooling water from the cooling water inlet-side manifold 12A to the cooling water flow path 12 and from the cooling water flow path 12 to the cooling water outlet-side manifold 12B.

Furthermore, in the anode-side separator 10 according to the embodiment described hereinabove, no recess portion is provided in the region 10C (FIG. 2) in contact with the MEA, thereby enabling the prevention of an occurrence of a damage caused by the MEA, which is in contact with the anode-side separator 10, eating into a recess portion.

Although this embodiment has been described by giving an example that there are provided the extend reinforcing portions 14A (specific protrusions) extending from the manifold beam portions 15 of the anode-side separator 10 to the gap region 13, it is also possible to provide reinforcing portions 24 extending from manifold beam portions 25 of the cathode-side separator 20 to a gap region 23 as indicated by dashed lines in FIG. 5. This enables the suppression of deformation of the manifold beam portions 25 of the cathode-side separator 20 in the stacking direction.

The present invention is not limited to the foregoing embodiments, and appropriate design modifications made by one skilled in the art to these specific embodiments are also within the scope of the present invention as long as they include the features of the present invention. Specifically, the elements included in the specific embodiments and the arrangement, material, condition, shape, size, etc. of the elements are not limited to those illustrated and may be appropriately modified. Moreover, it should be understood that the elements included in the foregoing embodiments may be combined with each other as long as technically possible and combinations thereof are also included in the scope of the present invention as long as they include the features of the present invention.

DESCRIPTION OF THE REFERENCE NUMERALS

1 Fuel cell battery
2 Fuel cell
10 Anode-side separator (Press type separator)
10A, 10B Central region (Power generation section)
10C Region in contact with membrane-electrode assembly
11A, 11B, 12A, and 12B Manifold
12 Cooling water flow path
13 Gap region
14 Specific protrusion (Reinforcing portion)
15 Manifold beam portion 20 Cathode-side separator (Flat type separator)
21 Central region (Power generation section)
22 Manifold
23 Gap region
24 Reinforcing portion
25 Manifold beam portion

What is claimed is:

1. A fuel cell separator comprising:
a power generation section provided in a central region of a surface of the fuel cell separator formed into a plate, the surface of the fuel cell separator extending in a longitudinal direction between two longitudinal end portions thereof;
a plurality of cooling water inlet-side manifolds provided in a first end portion of the two longitudinal end portions;
a plurality of inlet-side protrusions configured to protrude into a cooling water flow path, wherein the inlet-side protrusions are situated in a first gap region extending between the power generation section and the plurality of cooling water inlet-side manifolds;
a plurality of cooling water outlet-side manifolds provided in a second end portion of the two longitudinal end portions; and
a plurality of outlet-side protrusions configured to protrude into the cooling water flow path, wherein the outlet-side protrusions are situated in a second gap region extending between the power generation section and the plurality of cooling water outlet-side manifolds,
wherein the cooling water inlet-side manifolds and the cooling water outlet-side manifolds are provided at positions shifted from each other in a shorter dimension of the fuel cell separator when the fuel cell separator is viewed in a plan view,
wherein the inlet-side protrusions and the outlet-side protrusions are inclined so as to guide cooling water from the cooling water inlet-side manifolds to the cooling water outlet-side manifolds, and
wherein a portion of at least one of the inlet-side protrusions extends into a space between two of the cooling water inlet-side manifolds, and a portion of at least one of the outlet-side protrusions extends into a space between two of the cooling water outlet-side manifolds.

2. The fuel cell separator according to claim 1, wherein the inlet-side protrusions and the outlet-side protrusions each have a planar shape so as to guide cooling water from one of the cooling water inlet-side manifolds to the cooling water flow path or from the cooling water flow path to one of the cooling water outlet-side manifolds.

3. The fuel cell separator according to claim 1, wherein:
the fuel cell separator is configured to contact an anode side of a membrane-electrode assembly to form a fuel gas flow path; and
a portion of the fuel cell separator in contact with the membrane-electrode assembly does not include any recess portion.

4. A fuel cell comprising the fuel cell separator according to claim 1.

5. The fuel cell according to claim 4, further comprising a second fuel cell separator configured to be disposed opposite to a cathode side of a membrane-electrode assembly, wherein the second fuel cell separator has no grooves on a surface thereof which faces the membrane-electrode assembly.

6. A fuel cell battery comprising a plurality of the fuel cells according to claim 4 being stacked.

* * * * *